Patented June 4, 1929.

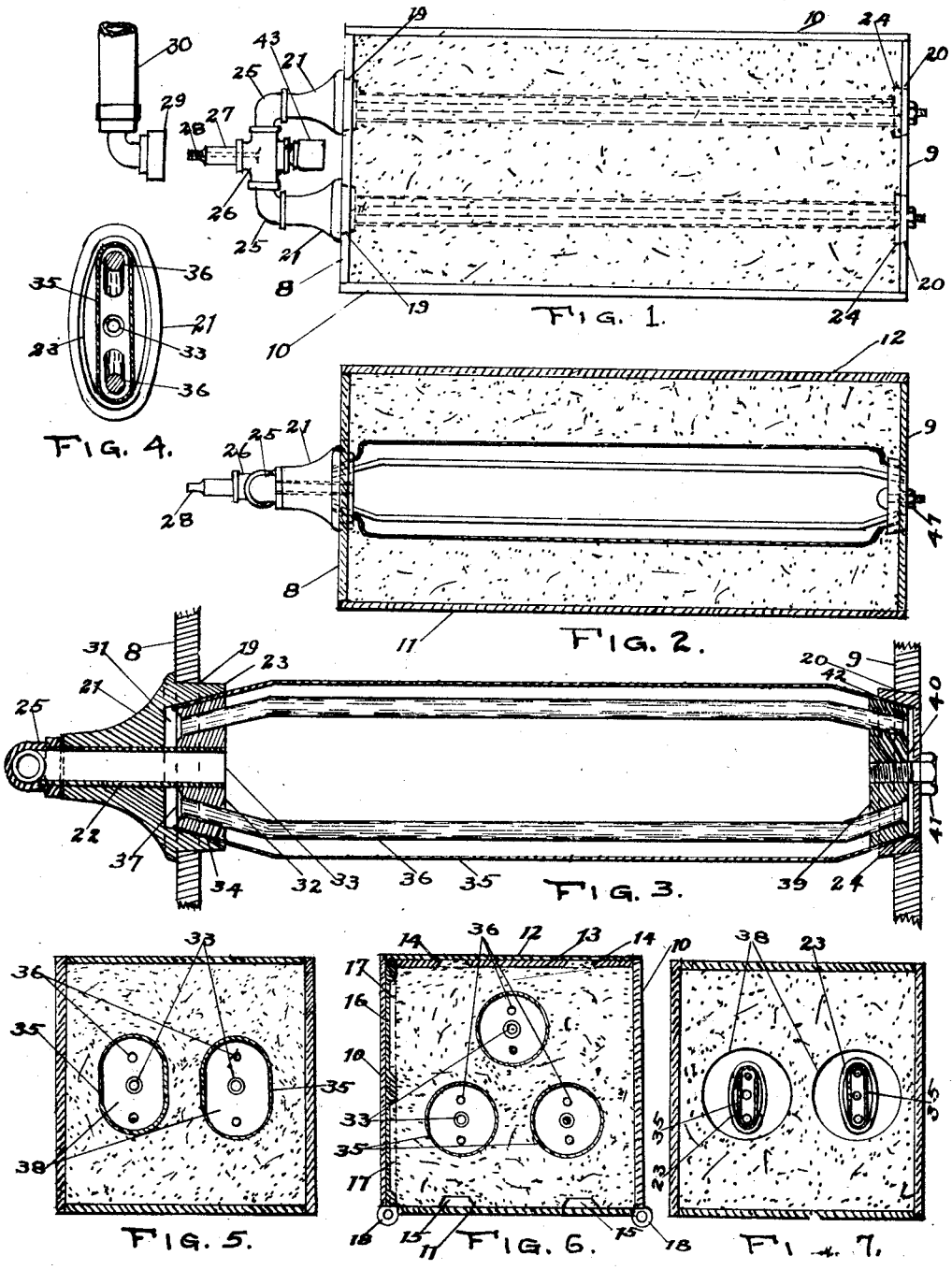

1,715,920

UNITED STATES PATENT OFFICE.

JOHN W. HENRY, OF CRAWFORDSVILLE, INDIANA.

BLOCK-MOLDING MACHINE.

Application filed March 25, 1927. Serial No. 178,246.

My invention relates to block molding machines in general, and more specifically to molding machines for the manufacture of concrete building blocks, bricks or tile having a hollow core or cores, and has for a principal object the provision of a machine to mold such blocks and tile by the use of compressed air. A further object is to provide a machine for molding such blocks by compressing the concrete from within outwardly, and to compress the block equally and uniformly in all lateral directions. A further object is to provide means to eliminate the use of movable pressure plates in forming and compressing said blocks, to insure the block being true and square and of the exact configuration of the mold employed. Another object is to provide means for compressing said blocks automatically to any predetermined degree, and to force the concrete in the center of the mold outwardly during the compressive action. Another object is to provide an expansible core forming member, said member not contacting with said mold but being readily removable therefrom. Another object is to provide a flexible core forming member which will be readily procurable in commercial stock when replacement becomes necessary. Other objects will appear as this specification proceeds.

With these objects in view, my invention consists essentially of the mechanism designated in the accompanying drawings, in which like numerals refer to like parts throughout, and in which Figure 1 is a general plan view of the mechanism positioned within a mold; Fig. 2 is a vertical elevation in section through one of the expansible members, while Fig. 3 is an enlarged sectional elevation of the operative mechanism removed from the mold, but with fragments of the mold attached thereto. Fig. 4 is a sectional elevation on line 4—4 of Fig. 3, while Fig. 5 is a sectional end elevation of a mold showing non-circular core forming members fully expanded. Fig. 6 illustrates an alternative arrangement of the core forming members, and Fig. 7 is a similar elevation showing the core members deflated and ready for removal from the mold.

With further reference to the drawings, the numerals 8 and 9 designate the end plates of the mold, 10 showing the side plates, 11 the bottom plate and 12 the top plate, these plates being retained in fixed position in any desired manner. It is apparent that these plates may be supplemented with other plates or means, as at 13 and 16, to produce a plurality of interlocking or retaining configurations, as at 14 and 15, or for ornamental face formation as at 17. 18 indicates a hinge formation for the mold, if desirable. Through end plates 8 and 9 a plurality of openings, 19 and 20, are provided, said openings being preferably tapered to receive a core head 21 in plate 8 and a core end 24 in plate 9. The core head 21 and end 24 are provided with internal recessed seats 31 and 40 to receive the clamping members 32 and 39, which are secured therein by the screw or bolt 41 at one end and by the nipple or tubular member 22 at the head end. These nipples are interconnected in any desired manner, as indicated here by an elbow 25, a T or cross 26, and a tubular connection 27, which may or may not have a threaded terminal 28 to engage the terminal 29 of the air pressure line indicated at 30. The terminal 29 carries a check valve (not shown) which is operated by contact with the terminal 28, and a blow-off valve, conventionally indicated at 43, may be employed to limit the pressure within the core forming member.

The clamping members 32 and 39 are retained in spaced relation by a plurality of formed bars 36 the ends of which may be inclined as shown in Fig. 3, rigidly secured to said clamping members by riveting, as at 37, or in other suitable manner. By altering the inclination of these formed ends the spacing of the clamping members may be slightly altered to fit the mold snugly. A core forming member or envelope 35 surrounds the rods 36 and members 32 and 39, and is fixedly secured at one end between member 32 and the recess 31 and at the opposite end between the member 39 and recess 40, as at 34 and 42 respectively. The fastenings 34 and 42 may be made more effective by extending the head 21 and end 24 inwardly as at 23.

The operation of the mechanism is readily apparent. The core forming members, previously assembled, are inserted through and positioned by the end plates 8 and 9, the mold filled with a predetermined quantity of concrete or other material, the upper plate 12 secured in position, and the air hose terminal 29 is applied on the terminal 28. The expansible core or envelope is expanded by the air pressure and in so expanding compresses the concrete into every portion of the mold. Removal of the terminal 29 allows the air from the core to escape through the orifice 33 and the envelope to return to its normal position so it may be withdrawn through the core 38 and the block may then be removed from the mold in the customary manner.

One important feature of my invention is the utilization of ordinary rubber tubing, cut to proper length, for the expansible core forming member. It is also a feature of my invention to employ a plurality of interconnected expansible core forming members to secure greater and more uniform expansion and compression of the concrete within the mold, and by so doing to obtain a more perfect block and a more rapid and economical production.

Having thus described my invention, what I claim as new and desire to protect by these Letters Patent is:—

1. In a plastic material molding machine having a rigid mold box, a plurality of aligned openings in two sides of said box, a flexible and expansible core forming element traversing said box in alignment with said openings, an end plate positioned within each end of said core forming element, said end plates being interconnected in spaced parallelism by a truss frame within said flexible element, said frame supporting said flexible element in definite conformation between said end plates when in deflated condition so that its upper and lower edges are essentially straight and in parallelism and its side walls essentially taut and smooth and in closely spaced parallel relation, said flexible element departing from said frame and assuming an essentially cylindrical conformation when inflated.

2. A core forming element for a plastic material mold box, consisting of an expansible tube mounted upon an end plate at each extremity thereof, a plurality of essentially parallel bars fixedly attached to said end plates to maintain said plates in essential parallelism and in fixed relation to each other, means for securing said expansible tube upon said end plates, said parallel bars having inclined ends and being spaced apart a distance equal to the major dimension of said expansible tube when same is deflated and its sides drawn essentially taut and parallel and adjacent one another, a single orifice through one of said end plates between said bars for inflation of said expansible tube, and means for supporting said element within said mold box.

3. In a core forming device having an expansible envelope, a centrally perforated plate in one end and a non-perforated plate in the other end of said envelope, said plates being maintained in spaced relation by a plurality of formed rods having inclined ends secured to said plates, said rods holding said plates in parallel relation, said rods holding said envelope in relatively definite conformation when said envelope is un-inflated, clamping means to secure said envelope upon said end plates, means for inflating said envelope through said perforation in said end plate, and means for positioning said device within a block forming mold.

4. In a core forming mechanism having an expansible tube, a formed plate in each extremity of said tube, an air inlet opening in one of said plates, a plurality of clamping heads coacting with said formed plates to secure the extremities of said tube therebetween, a plurality of spaced rods fixedly mounted upon said formed plates to maintain said plates in parallel spaced relation, means internally of said tube to maintain said tube in definite conformation when unexpanded, the upper and lower edges of said tube being held in remote spaced parallelism and the side walls taut vertically and in closely adjacent parallelism, a mold box to support said clamping heads with said parallel tube walls in vertical position and in parallel relation to the side walls of said mold box to facilitate easy and uniform filling of said mold box, means for inflating and deflating said tube and means for removing said tube from said mold box, essentially as described.

In testimony whereof I have signed my name to this specification.

JOHN W. HENRY.